United States Patent [19]
Fujisaki

[11] Patent Number: 5,903,569
[45] Date of Patent: May 11, 1999

[54] DIGITAL SERIAL DATA INTERFACE

[75] Inventor: Naoki Fujisaki, Kanagawa, Japan

[73] Assignee: Sony Corporation, Tokyo, Japan

[21] Appl. No.: 08/493,732

[22] Filed: Jun. 22, 1995

[30] Foreign Application Priority Data

Jun. 27, 1994  [JP]  Japan .................................. 6-144403

[51] Int. Cl.$^6$ ..................................................... H04J 3/22
[52] U.S. Cl. ......................... 370/472; 370/474; 370/538; 370/543
[58] Field of Search ..................................... 370/532, 535, 370/536, 537, 538, 468, 474, 472, 542, 543

[56] References Cited

U.S. PATENT DOCUMENTS

| | | | |
|---|---|---|---|
| 4,855,999 | 8/1989 | Chao ........................................ | 370/538 |
| 4,864,562 | 9/1989 | Murakami et al. . | |
| 5,138,440 | 8/1992 | Radice . | |
| 5,164,938 | 11/1992 | Jurkevich et al. . | |
| 5,199,030 | 3/1993 | Ueda . | |
| 5,247,516 | 9/1993 | Berstein et al. . | |
| 5,381,412 | 1/1995 | Otani . | |
| 5,392,284 | 2/1995 | Sugiyama ................................ | 370/538 |

FOREIGN PATENT DOCUMENTS

| | | |
|---|---|---|
| 0 598 295 | 5/1994 | European Pat. Off. . |
| WO 94/07332 | 3/1994 | WIPO . |

OTHER PUBLICATIONS

Proposed SMPTE Standard for Television—10–Bit 4:2:2 Component and $4f_{SC}$ Composite Digital Signals Serial Digital Interface, SMPTE 259M, Seventh Draft, Feb. 16, 1994.
"10–Bit 4:2:2 Component and 4FSC NTSC Composite Digital Signals Serial Digital Interface", SMPTE Journal, vol. 102, No. 2, Jan. 1, 1993, pp. 174–179, XP000349969.
Davies, K. P.: "Some Concepts for the Digital Television Studio", 4:2:2 Digital Video, Background and Implementation, Jan. 1, 1989, Pensinger G., pp. 77–82, XP000124534.

Reynolds, K. Y. et al: "Multiplexing and Demultiplexing Digital Audio and Video in Today's Digital Environment", SMPTE Journal, vol. 102, No. 10, Oct. 1, 1993, pp. 905–909, XP000409174.

Richter, H. P.: "Digitale Fernsehstudios fuer die Bildformate 4:3 und 16:9", Rundfunktechnische Mitteilungen, vol. 36, No. 4, Jul. 1, 1992, pp. 145–152, XP000316155.

Webster, S. et al: "A New Chip Set for Proposed SMPTE Standard SMPTE 259M—Serial Digital Interface", SMPTE Journal, vol. 102, No. 9, Sep. 1, 1993, pp. 777–785, XP000397314.

Bursky, D.: "Chip Set Simplifies High–Speed Interconnects the First ICS to Realize the P1394 Serial–Bus Standard Let Designers Build Serial Connections Running at 100 to 400 MBits/S", Electronic Design, vol. 42, No. 5, Mar. 7, 1994, pp. 114–117, XP000441329.

Teener, M.: "A Bus on a Diet—The Serial Bus Alternative an Introduction to the P1394 High Performance Serial Bus", Intellectual Leverage, San Francisco, Feb. 24–28, 1992, No. Conf. 37, Feb. 24, 1992, Institute of Electrical and Electronics Engineers, pp. 316–321, XP000340753.

*Primary Examiner*—Min Jung
*Attorney, Agent, or Firm*—Frommer Lawrence & Haug, LLP.; William S. Frommer

[57] ABSTRACT

A method and apparatus for digital signal transmission, in which data of plural media is transmitted and received over a communication transmission channel. A digital signal format for the transmitted digital signal has an ancillary data section ANC within which there are a plurality of channels for audio signals, each channel including a leading line number area LN, a type area TP, a byte count area BC, an error correction code ECC and a data area DT. The digital signal format also has a payload section PAD within which there are a plurality of channels for video signals, or the like. Each channel includes a type area TP, a byte count area BC, an error correction code ECC and a data area DT.

12 Claims, 14 Drawing Sheets

| 9(MSB) | 8 | 7 | 6 | 5 | 4 | 3 | 2 | 1 | 0(LSB) |
|---|---|---|---|---|---|---|---|---|---|
| /8 | P | LCT | LN6 | LN5 | LN4 | LN3 | LN2 | LN1 | LN0 |

FIG.4A

LINE NUMBER AREA LN

| 9(MSB) | 8 | 7 | 6 | 5 | 4 | 3 | 2 | 1 | 0(LSB) |
|---|---|---|---|---|---|---|---|---|---|
| /8 | P | TCT | T6 | T5 | T4 | T3 | T2 | T1 | T0 |

FIG.4B

TYPE AREA TP

| 9(MSB) | 8 | 7 | 6 | 5 | 4 | 3 | 2 | 1 | 0(LSB) |
|---|---|---|---|---|---|---|---|---|---|
| /8 | P | BCT | BC6 | BC5 | BC4 | BC3 | BC2 | BC1 | BC0 |

FIG.4C

BYTE COUNT AREA BC

| 9(MSB) 8 | 7 | 6 | 5 | 4 | 3 | 2 | 1 | 0(LSB) | |
|---|---|---|---|---|---|---|---|---|---|
| /8 | P | 0 | LN6 | LN5 | LN4 | LN3 | LN2 | LN1 | LN0 | LINE NUMBER AREA LN |

FIG.5A

| 9(MSB) 8 | 7 | 6 | 5 | 4 | 3 | 2 | 1 | 0(LSB) | |
|---|---|---|---|---|---|---|---|---|---|
| /8 | P | 1 | LN6 | LN5 | LN4 | LN3 | LN2 | LN1 | LN0 | LINE NUMBER AREA LN$_1$ |
| /8 | P | 0 | LN13 | LN12 | LN11 | LN10 | LN9 | LN8 | LN7 | LINE NUMBER AREA LN$_2$ |

FIG.5B

| 9(MSB) 8 | 7 | 6 | 5 | 4 | 3 | 2 | 1 | 0(LSB) | |
|---|---|---|---|---|---|---|---|---|---|
| /8 | P | 1 | LN6 | LN5 | LN4 | LN3 | LN2 | LN1 | LN0 | LINE NUMBER AREA LN$_1$ |
| /8 | P | 1 | LN13 | LN12 | LN11 | LN10 | LN9 | LN8 | LN7 | LINE NUMBER AREA LN$_2$ |
| /8 | P | 0 | LN20 | LN19 | LN18 | LN17 | LN16 | LN15 | LN14 | LINE NUMBER AREA LN$_3$ |

EAV | 1 | 2 | ... | n | SAV | 1 | 2 | 3 | ... | n

FIG.6B

EAV | 1 | 2 | ... | n | SAV | ... | n

DIGITAL SERIAL DATA INTERFACE

FIELD OF THE INVENTION

This invention relates to a method and apparatus for transmitting and receiving a digital data signal in a digital data communication system, such as a local area network (LAN), or the like.

BACKGROUND OF THE INVENTION

Among the apparatus for handling and receiving speech signals or audio signals, there is video equipment, such as a television, or audio equipment, such as a radio, CD player, MD player or a video tape recorder (VTR). As a method for communication of signals employed in such apparatus, such as a video tape recorder (VTR), with other equipment, a serial digital interface (SDI) format is proposed by the Society of Motion Picture and Television Engineers (SMPTE) in *Proposed SMPTE Standard for Television-10-bit 4:2:2 Component and 4fsc Composite Digital Signals Serial Digital Interface* (SMPTE-295M, 1994Revision-Seventh Draft, Feb. 16, 1994) as a standard for digital audio and video signals. This SDI standard is basically a standard for signals governed by D-1 or D-2 formats for digital signals. The disclosure of Proposed SMPTE standard SMPTE-295M is hereby incorporated herein by reference.

FIG. 1 shows a schematic arrangement of the SDI format which represents the application of D-1 format signals.

An upper part of FIG. 1 shows a frame format of a frame made up of 1716 samples in the horizontal direction and 525 lines in the vertical direction. Digital video signals are placed in a first field active video section $AVC_1$ of 1440 horizontal samples and 244 vertical lines and a second field active video section $AVC_2$ of 243 lines. Specifically, the first field active video section $AVC_1$ is a digital video signal of odd fields and the second field active video section $AVC_2$ is a digital video signal of even fields. Ahead of the first field active video section $AVC_1$ and the second video active section $AVC_2$ are respectively inserted 9-line vertical blanking section $VBK_1$, $VBK_2$ and 10-line optional blanking sections $OBK_1$, $OBK_2$. Ahead and back of the first field active video section $AVC_1$, second video active section $AVC_2$, vertical blanking sections $VBK_1$, $VBK_2$ and the optional blanking sections $OBK_1$, $OBK_2$ are inserted a 4-sample start synchronization code SAV indicating the start of an active line and a 4-sample end synchronization code EAV indicating the end of the active line. Between the start synchronization code SAV and the end synchronization code EAV are placed 268 samples of an ancillary data section ANC which are ancillary data for horizontal blanking. A mid part of FIG. 1 indicates a signal of a frame format shown at the upper part of FIG. 1 in a line format having a width of 10 bits. For transmitting signals of the SDI format, parallel/serial conversion and encoding of the transmission channel are carried out as shown at a lower part of FIG. 1, and the signals are transmitted as serial signals having a data rate of 270 Mbps.

Although data transmission by the SDI format is achieved at a high speed, the SDI format is not suited as a transmission channel for variegated data, while it is possible to transmit only a limited type of data (information). Specifically, the data sorts capable of being transmitted include one channel of picture signals( or video signals) and 8 channels at most of speech signals (or audio signals) as the base band digital audio signals. Thus the SDI format is not suited to transmission and reception of plural channels of the same sort of data or channel multiplication for coping with transmission and reception of plural sorts of data. On the other hand, data other than picture signals or speech signals are transmitted over a physically separate channel. In addition, the SDI format basically takes account only of one-to-one unidirectional data transmission.

In general, when simultaneously transmitting plural sorts of data, the method of providing a data transmission channel for each data sort is simple and easy, it being unnecessary to carry out data processing for transmitting excessive data. However, this presents a problem in efficiency and economic profitability in connection with cost involved in the entire data transmission system, cost involved in the data transmission channel, or labor in maintenance or extendibility of the data transmission system.

In local networks employed in data communication (LAN), especially in information processing equipment, data communication channels, such as Ethernet or token ring, have become popular in use. However, such data communication channel inherently has been developed as a data communication channel handling temporally discrete data, such as packet data employed for an electronic computer, while it is not suited as a transmission channel for temporally continuous data, such as picture/video or speech/audio signals, which require maintenance of a temporal relation between the transmitting and receiving sides. On the other hand, the data transmission rate of the data communication channel is rather low and is not suited to transmission of picture signals which require wide frequency range, or bandwidth.

The technological tendency in the near future is to digitize all kinds of the information, inclusive of the picture/video and speech/audio data, and to treat the information simply as a bitstream irrespective of the data type. Above all, in the future digital integrated network, exemplified by the AM technique, all kinds of data are transmitted as a multiplexed bitstream. If such technical tendency is taken into consideration, the SDI format currently standardized for picture signal transmission is not fully satisfactory, while there lacks at present a particular data format for multiplexing and transmitting various data and control signals among plural communication equipment.

SUMMARY OF THE INVENTION

In view of the foregoing, it is an object of the present invention to provide a method and apparatus for transmitting and receiving a digital signal, whereby plural sorts, or types, of picture/video and speech/audio signals and the like may be transmitted as one bitstream.

In one aspect, the, present invention provides a method for transmitting a digital signal in which a digital signal format of a transmitted digital signal is constituted by a first data portion made up of digital video data, a start synchronization code and an end synchronization code for bit synchronization for the first data portion, and an auxiliary data portion located between the start synchronization code and the end synchronization code and which is made up of plural split areas. Each of the split areas of the auxiliary data portion contains at least one of a type area indicating the data type, a byte count area indicating the data volume and a data area which is a second data portion made up of digital audio data.

At the leading end of the auxiliary data portion, there is provided a line number area indicating the line number of the data.

The auxiliary data portion contains an error correction code for detecting and correcting errors in data of the type area and the byte count area.

The first data portion is made up of digital video data of a plurality of channels and the second data portion is made up of digital audio data of plurality of channels. Of course, the first data portion could also constitute audio data or other data. Likewise, the second data portion could constitute video or other data. The digital signal format contains transmission data and reception data used to identify and characterize the format and nature of the data being transmitted.

In another aspect, the present invention provides an apparatus for transmitting a digital signal having a plurality of data outputting media sources, a plurality of delay adjustment units for respectively adjusting the delay of the data from said media sources, a plurality of rate converting units for converting the data transmission rate of the respective data from the rate converting units into a transmission rate of a transmission channel, a plurality of attribute information processing units for appending the attribute information to the respective data from the rate converting units, a multi-media switching unit for optionally selecting data of the respective media sources from the attribute information processing units, a transmission controlling unit for controlling the delay adjustment units, rate converting units, attribute information processing units and the multi-media switching unit, and a multiplexing unit for multiplexing plural data from the multimedia switching unit.

In a still another aspect, the present invention provides a device for receiving a digital signal having a demultiplexing unit for demultiplexing plural multiplexed data into media source based data, a demultiplexed media switching unit for switching plural data from the demultiplexing unit into respective suitable media channels, a plurality of attribute information processing units for processing the plural data switched by the demultiplexed media switching unit based upon the attribute information for these data, a plurality of rate converting units for converting the transmission rate of the respective data from the attribute information processing units into the playback rate for data reproduction, a plurality of delay adjustment units for adjusting the respective data from the plural rate conversion units into optimum delay amounts, and a plurality of media reproducing units for respectively reproducing the data from the delay adjustment units.

In yet another aspect, the present invention provides a digital signal transmission and reception device having the above-mentioned digital signal transmitting device and the above-mentioned digital signal receiving device on the signal transmitting and signal receiving sides, respectively.

With the method for transmitting the digital signal according to the present invention, the digital signal, such as digital video data or digital video data, is transmitted in a digital signal format interchangeable with the SDI format of the conventional digital signal transmitting method, that is a digital signal format having a first data portion made up of digital video data, a start synchronization code portion, an end synchronization code portion, and an auxiliary data portion. Each of the split areas of the auxiliary data portion contains at least one of a type area indicating the data type, a byte count area indicating the data volume, and a data area which is a second data portion made up of digital audio data. At the leading end of the auxiliary data portion, there is provided a line number area indicating the line number of the data, while the first data portion is made up of digital video data of plural channels and the second data portion is made up of digital audio data of plural channels.

With the method for transmitting the digital signal, data from plural media are transmitted in the above-defined digital signal format. The transmitted data is received by a digital signal receiving device where data from plural media are reproduced.

The digital signal format proposed by the present invention assures upward compatibility with respect to a device for transmitting and receiving data of the conventional SDI format and hence has affinity, or compatibility, to the existing digital signal transmission system. In addition, past network resources may be directly exploited, while any newly arising cost may be minimized and the equipment employing the conventional SDI format may be introduced into another sort of network. It is also possible to interconnect a system exploiting the present digital signal transmitting method, a network or system such as existing computer network and an integrated digital network such as future ATM network in order to effect digital signal transmission between the interconnected systems.

By providing a line number area indicating the data line number at the leading end of the auxiliary data portion, an optional number of line numbers can be set, so that asymmetrical digital signal transmission, such as 1:n transmission, becomes feasible in addition to the conventional 1:1 digital signal transmission.

By providing the auxiliary data portion having error correction code for error detection and correction for the type area data and the byte count area data, digital signals may be transmitted more correctly.

The first data portion is made up of digital video data of plural channels and the second data portion is made up of digital audio data of plural channels, so that multi-channel transmission of plural media data inclusive of encoded data may be realized on a sole transmission channel.

The digital signal format contains both the data for transmission and data for reception, so that sole media data may be bi-directionally transmitted by serial digital communication.

With the digital signal transmission device and the signal reception device of the present invention, the conventional SDI format employed in video equipment may be extended to a more variegated communication system for general digital data inclusive of base-band audio data and video data, thus enabling more general digital communication. Since communication of plural media data is physically possible by a sole communication medium, system flexibility and hence system maintenance and management such as network modification may be improved significantly.

With the digital signal transmission/reception device of the present invention, since the arrangement of the digital signal reception device and that of the digital signal transmission device may be combined together, interconnection with a digital data network, such as an external computer, or a digitized public network, such as ISD, as well as with a network between existing video equipment, may be facilitated, thus allowing it to realize reciprocal communication between all sorts of media easily and broadly. This provides a more intimate relation between networks and more efficient integration, separation, editing, management, maintenance and retrieval of plural media efficiently and in a short time irrespective of the contents of digitized data, thus enabling more flexible long-term network construction.

BRIEF DESCRIPTION OF THE DRAWINGS

FIG. 4a illustrates an illustrative construction of a line number area, type area and a byte count area.

FIG. 4b illustrates an illustrative construction of a line number area, type area and a byte count area.

FIG. 4c illustrates an illustrative construction of a line number area, type area and a byte count area.

FIG. 5a illustrate a construction of a line number area for extension of the number of line numbers.

FIG. 5b illustrate a construction of a line number area for extension of the number of line numbers.

FIG. 5c illustrate a construction of a line number area for extension of the number of line numbers.

FIG. 6a illustrate a schematic construction of a line format according first example of application of the SDDI format.

FIG. 6b illustrate a schematic construction of a line format according to a first example of application of the SDDI format.

DESCRIPTION OF THE PREFERRED EMBODIMENTS

Figure 1:
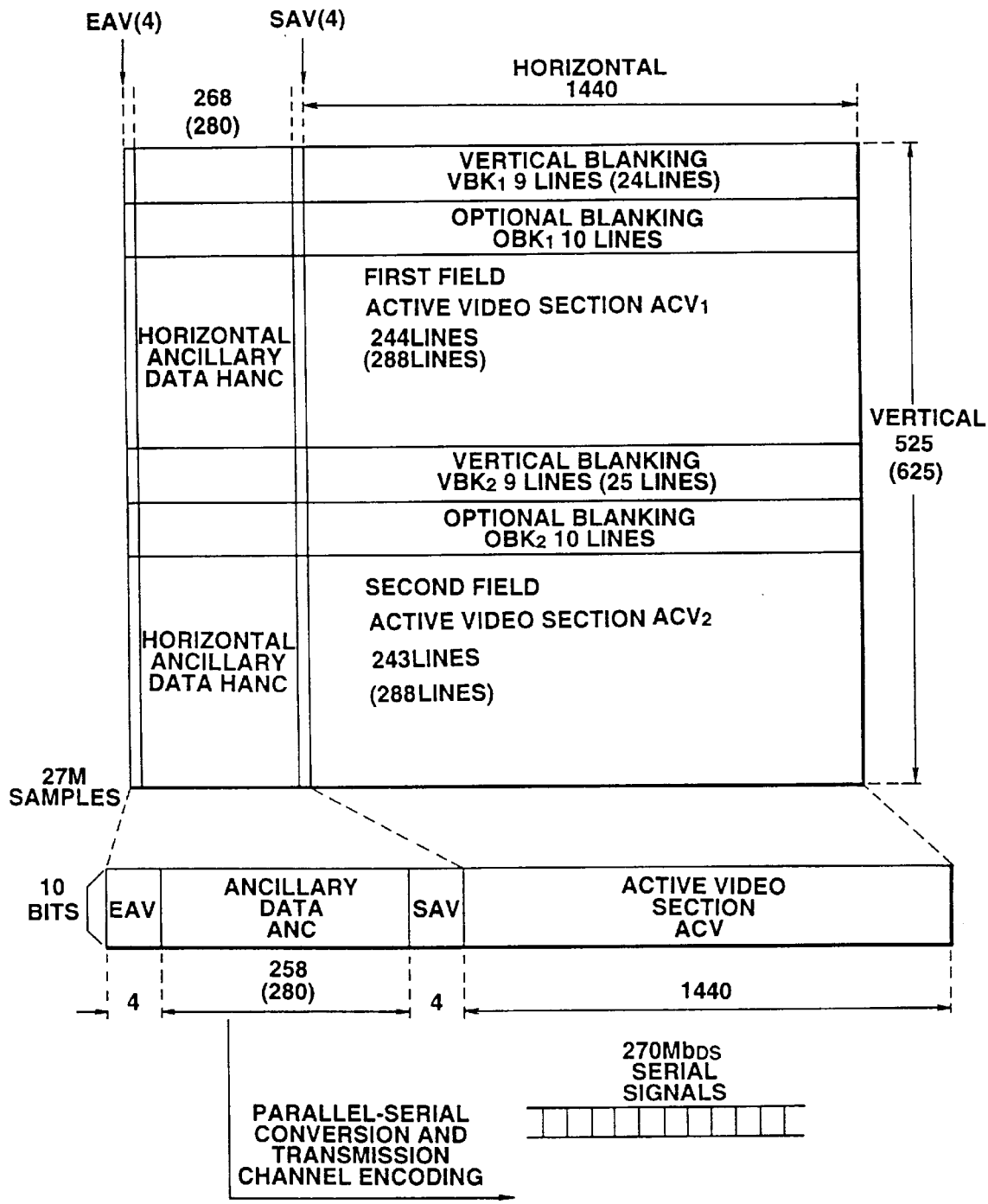
FIG. 1 illustrates a schematic arrangement of a conventional SDI format.

Referring to the drawings, preferred illustrative embodiments of the present invention will be explained in detail.

Figure 2:
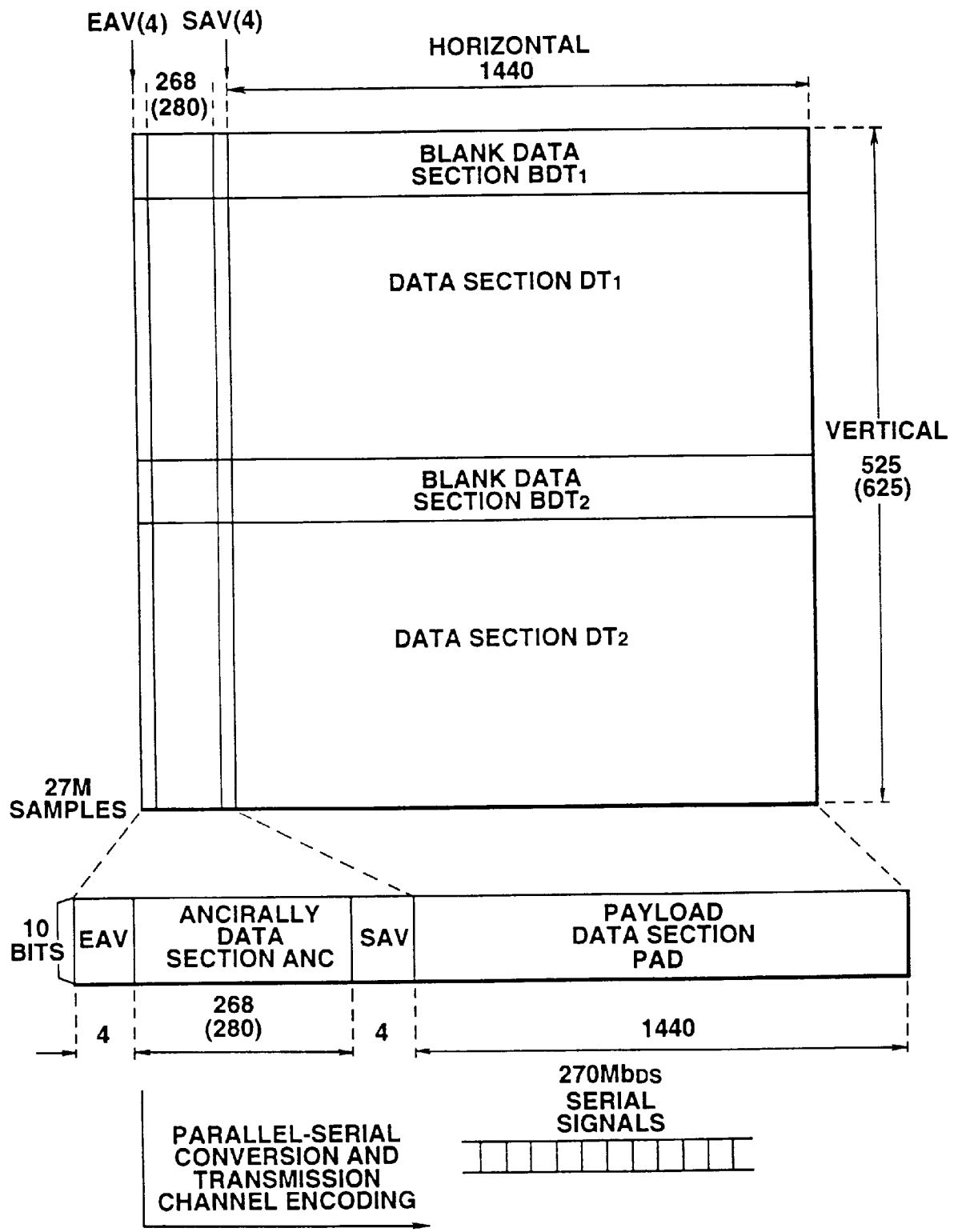
FIG. 2 illustrates a schematic arrangement of a SD1 format according to the method for transmitting a digital signal according to the present invention.

FIG. 2 illustrates a schematic arrangement of a signal format employing the method for digital signal transmission according to the present invention. Specifically, the signal format is termed a serial digital data interface (SDDI) format. The SDDI format shown in FIG. 2 is an application of the D-1 format.

The SDDI format has a first data section $DT_1$ and a second data section $DT_2$. Ahead of the first data section $DT_1$ and the second data section $DT_2$ are inserted blank data sections $BDT_1$ and $BDT_2$, respectively. Ahead and back of the data sections $DT_1$ and $DT_2$ and the blank data sections $BDT_1$ and $BDT_2$ are put 4-sample start synchronization code SAV and 4-sample end synchronization code EAV, respectively. Between the start synchronization code SAV and the end synchronization code EAV is put an ancillary data section ANC, which is auxiliary data.

The present SDDI format, thus taking interchangeability with the conventional SDI format into account, represents extension of the SDI in some respects. Specifically, a frame format shown at an upper part of FIG. 2, that is the blank data sections $BDT_1$ and $BDT_2$ of the format in the vertical direction, may be freely changed as to the positions and the numbers of lines thereof by setting of the data type and the line numbers as later explained. Thus the blank data sections $BDT_1$ and $BDT_2$ may be set in the same manner as for the conventional SDI format. Consequently, with a system configuration in which signal switching may be made at a vertical blanking period by an existing lauter or switcher, SDDI format data may be employed in a form in which it is precompleted in units in the vertical blanking period. Also, depending on data setting, effective data may be inserted in the entire frame area to provide data sections $DT_1$, $DT_2$. Thus the SDDI format allows for flexible system construction.

The line format shown at a mid part of FIG. 2, that is the horizontal format, is made up of a 4-sample end synchronization code EAV, 268-sample ancillary data section ANC, a 4-sample start synchronization code SAV and a 1440-sample payload section PAD. With the present SDDI format, similarly to the conventional SDI format, the start synchronization code SAV and the end synchronization code EAV are inserted, so that interchangeability may be maintained between signals of the SDDI format and those of the SDI format.

When transmitting signals of the SDDI format, similarly to the transmission of the conventional SDI format signals, parallel-to-serial conversion and transmission channel coding are carried out and signal transmission occurs as serial signals having a data rate of, for example, 270 Mbps as shown at a lower part of FIG. 2.

Figure 3:
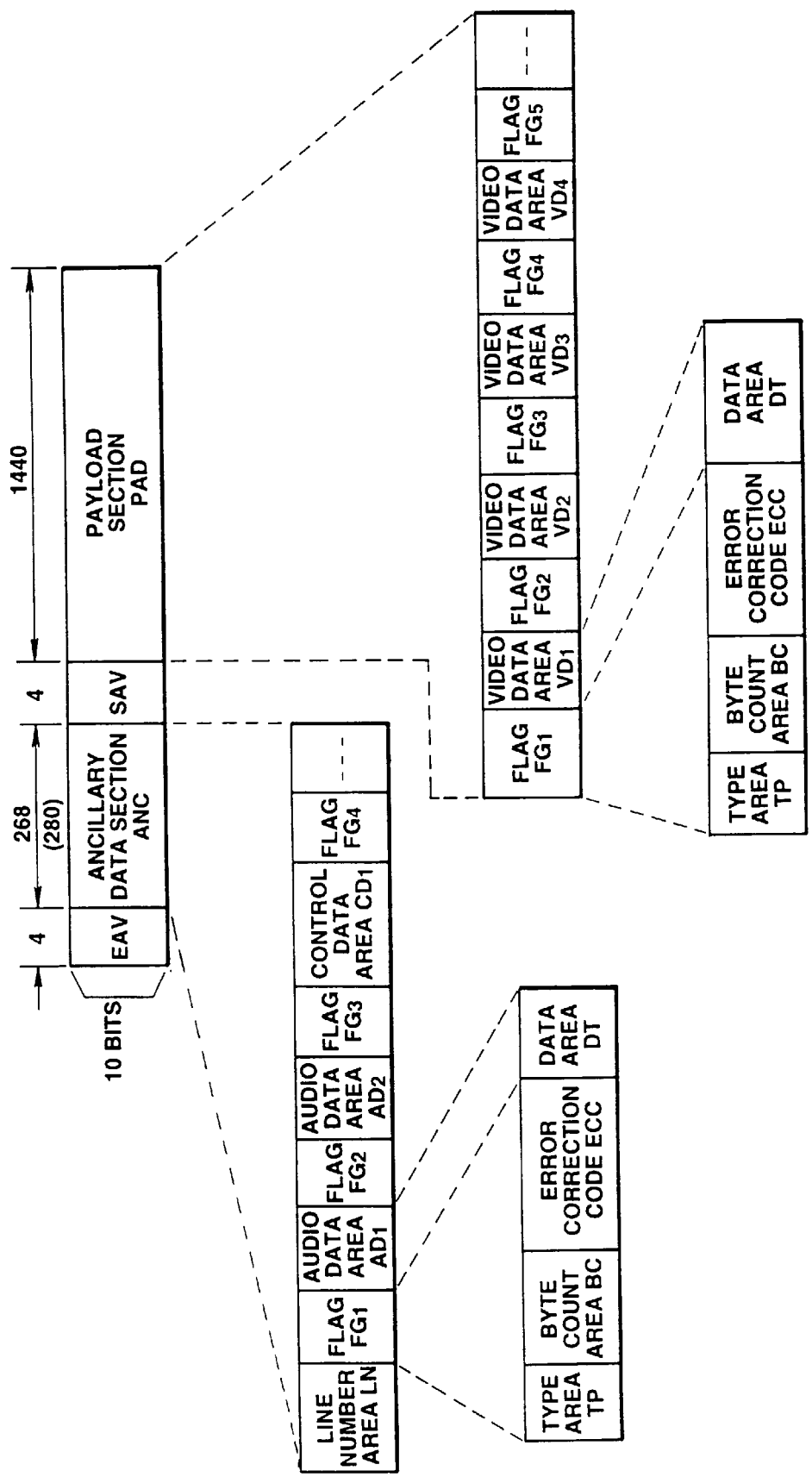
FIG. 3 illustrates a typical arrangement of a line format of the SDI format shown in FIG. 1.

FIG. 3 shows an illustrative constitution of the SDDI format.

At a leading end of the ancillary data section ANC is put a line number area LN indicating the number to which belongs the line data, as shown at an upper part of FIG. 3. By setting the line number, the vertical blanking domain of a particular line number can be regenerated, as in the case of the conventional SDI format. Within the ancillary data section ANC can be put audio data and control data of plural channels, such as audio data areas $AD_1$ or $AD_2$ or control data area $CD_1$, in a mixed state. Also, data of one channel can occupy data areas of a variable length based upon respective transmission rates of plural sorts of data. Specifically, the audio data area AD or the control area data CD are combined with flags FG to constitute one-channel data. Such one-channel data may be constituted by a flag FG$_1$, an audio data area AD$_1$, a flag FG$_2$, an audio data area AD$_2$, a flag FG$_3$, a control data area CD$_1$, a flag FG$_4$, ... as shown for example at FIG. 3.

One data channel is made up of a type area TP, a byte count area BC, an error correction code ECC and a data area DT, as shown at a mid part of FIG. 3. The type area TP denotes the contents of data of the data area DT, while the byte count area BC denotes the length of data of the data area DT. The error correction code ECC includes a check sum or a cyclic redundancy code (CRC) of the type area TP and the byte count area BC. By the error correction code ECC, error detection and correction is carried out of the type area TP and the byte count area BC.

Within the payload section PAD can be put video data of plural channels in a mixed state. The video data of the respective channels is made up of flags FG and video areas VD. Thus the video data is constituted by a flag FG$_1$, a video data area VD$_1$, a flag FG$_2$, a video data area VD$_2$, a flag FG$_3$, a video data area VD$_3$, a flag FG$_4$, a video data area VD$_4$, flag FG$_5$, ... as shown at a lower part of FIG. 3. One data channel is made up of a type area TP, a byte count area BC, an error correction code ECC and a data area DT, similarly to the constitution of the data channel in the ancillary data section ANC, as shown at a lower part of FIG. 3.

The detailed arrangement of the line number area LN, type area TP and the byte count area BC is shown in FIGS. 4a, 4b and 4c, respectively.

The line number area LN is made up of 10 bits and indicate the line number by 7 bits, that is bit 0 (LN0) up to bit 6 (LN6). Bit 7 or LCT is a bit for extension of the line number area and indicates whether or not the line number area LN has been extended. Bit 8 and bit 9 indicate an even number parity of the values from bit 0 to bit 7 and an inversion of the bit 8, respectively.

The number of the line number areas LN may be increased by setting the bit 7, if necessary, as described above. The illustrative construction of the line number area at the time of extension of the number of line numbers is shown in FIG. 5A, FIG. 5B & FIG. 5C. If the bit 7 of the line number area LN is 0, as shown in FIG. 5A, the line number area LN is not extended and the line number is indicated solely by the line number area LN. However, if the bit 7 of the first line number area LN$_1$ is 1, as shown at a mid part of FIG. 5B, the next 1-word area, made up of 10 bits, is also an area indicating the line number, that is a line number area LN$_2$. Referring to FIG. 5b, since bit 7 of the line number area LN$_2$ is 0, the region up to the bit 7 becomes the line number area LN. The line number area may be extended by two words, as shown in FIG. 5c. In this case, the line number is denoted using LN0 to LN20 by bits 0 to 6 of the line areas LN$_1$ LN$_2$ and LN$_3$. An optional number of line numbers may be set by extending the line number area LN in this manner.

The type area shown in FIG. 4b and the byte count area shown in FIG. 4c are defined as header data for data. Thus the type area TP denotes the contents of data by the values of from T0 of bit 0 to T6 of bit 6. Data types are defined depending on the data sorts, such as type '00' for audio data of the MPEG system and for video data of the MPEG system, respectively. By defining data types of invalid data, such as blank data, it becomes possible to set a line corresponding to the vertical blanking domain, while it also becomes possible to cope with a system of switching the signals on the field basis, such as an existing lauter or a switcher. The byte count area BC denotes the length of the next following data area DT by the values of BC0 of bit 0 to BC6 of bit 6. Similarly to the line number area LN, both the type area TP and the byte count area BC can be extended depending on the value of the extension bit of bit 7 thus enabling flexible area setting. Meanwhile, the bit 8 of the type area TP and bit 8 of the byte count area BC are even-number parities of the values of bit 0 to bit 7, while bit 9 of the type area TP and bit 9 of the byte count area BC are inverted values of the bits 8.

If, with the above-described SDDI format, the signals of the ancillary data section ANC and the payload section PAD are replaced by signals of the D-1 format, the resulting format is the conventional D-1 format itself, thus assuring complete interchangeability between the SDDI format signals and the SDI format signals.

Figures 6A, 6B:
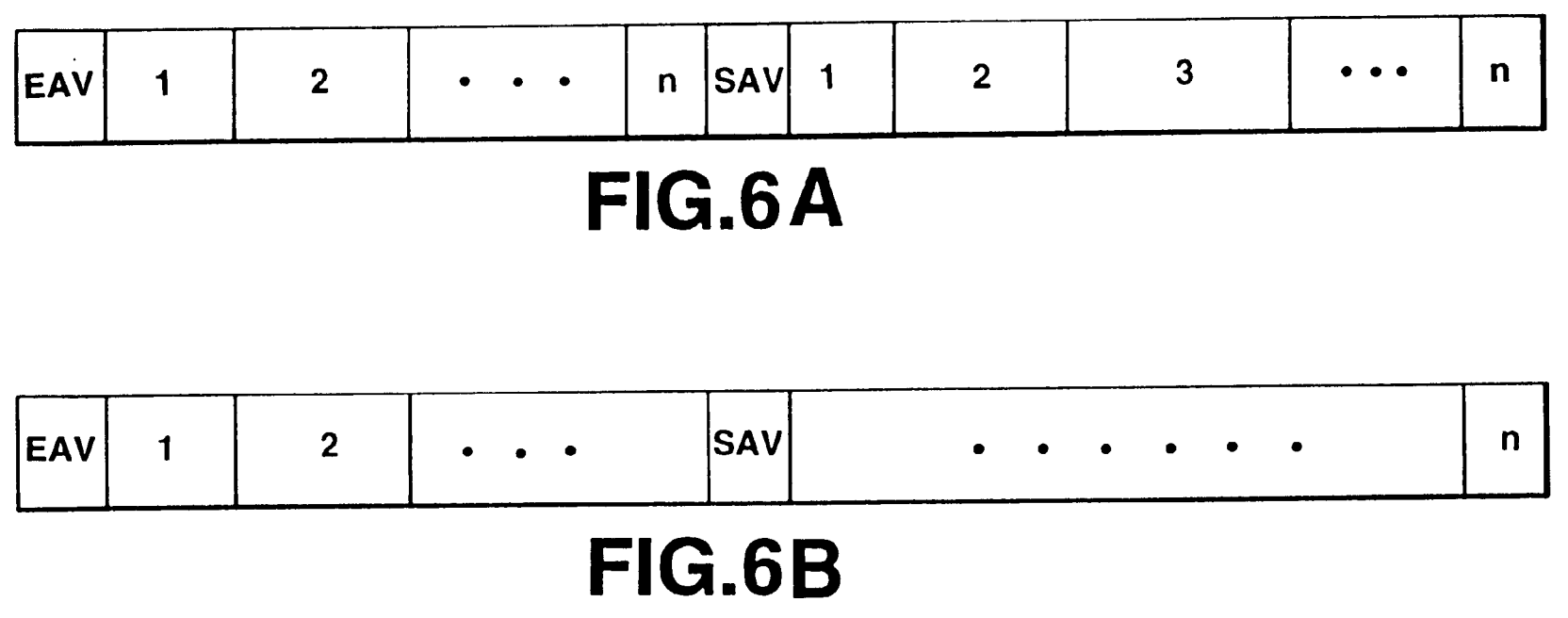

An example of a first application of the method for digital signal transmission is shown in FIG. 6A and FIG. 6B.

Figure 7A:
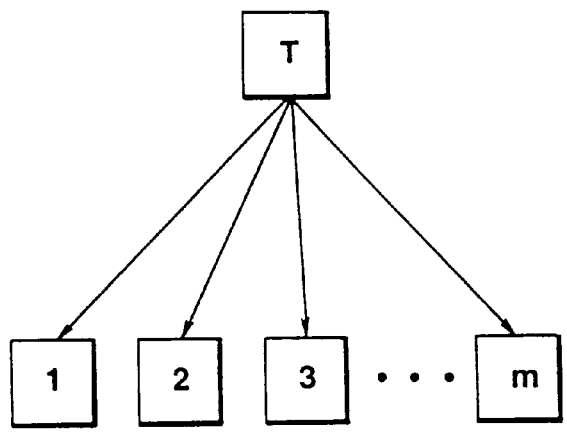
FIG. 7a illustrate a schematic arrangement of a 1:m broadcast communication system when employing a line format of the first example of application of FIG. 6.
Figure 7B:
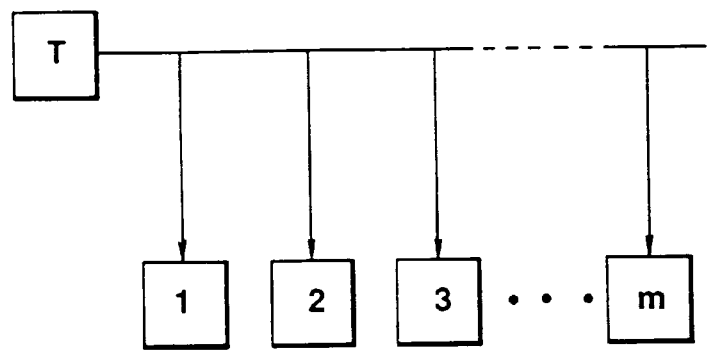
FIG. 7b illustrate a schematic arrangement of a 1:m broadcast communication system when employing a line format of the first example of application of FIG. 6.
Figure 7C:
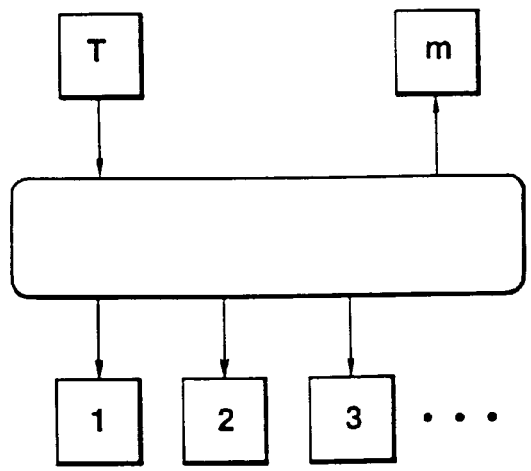
FIG. 7c illustrate a schematic arrangement of a 1:m broadcast communication system when employing a line format of the first example of application of FIG. 6.

In the first example of application, each of the ancillary data section and the payload section in the SDDI format is divided into data having n sub-areas, as shown in FIG. 6a. Alternatively, the entire area excluding the start synchronization code SAV and the end synchronization code EAV is divided into data having n sub-areas, as shown in FIG. 6b. If, when the area is divided into n sub-areas in the SDDI format, as with the present first example of application, each of data communication equipment having a 1:m connection employs each 1/n sub-area, it becomes possible to achieve n-channel broadcast type data communication between a data transmission equipment and m̲ data reception equipment. The interconnection between the data transmission equipment T and the m̲ data reception equipment may be of a star shape as shown in FIG. 7A, a bus type as shown in FIG. 7b or of a ring type as shown in FIG. 7c. It is also possible for the m̲ data reception equipment to receive data of a desired one of n̲ sub-areas or to perform communication service of receiving data of synchronous reception of data of a specified sub-area.

Figures 8A, 8B:
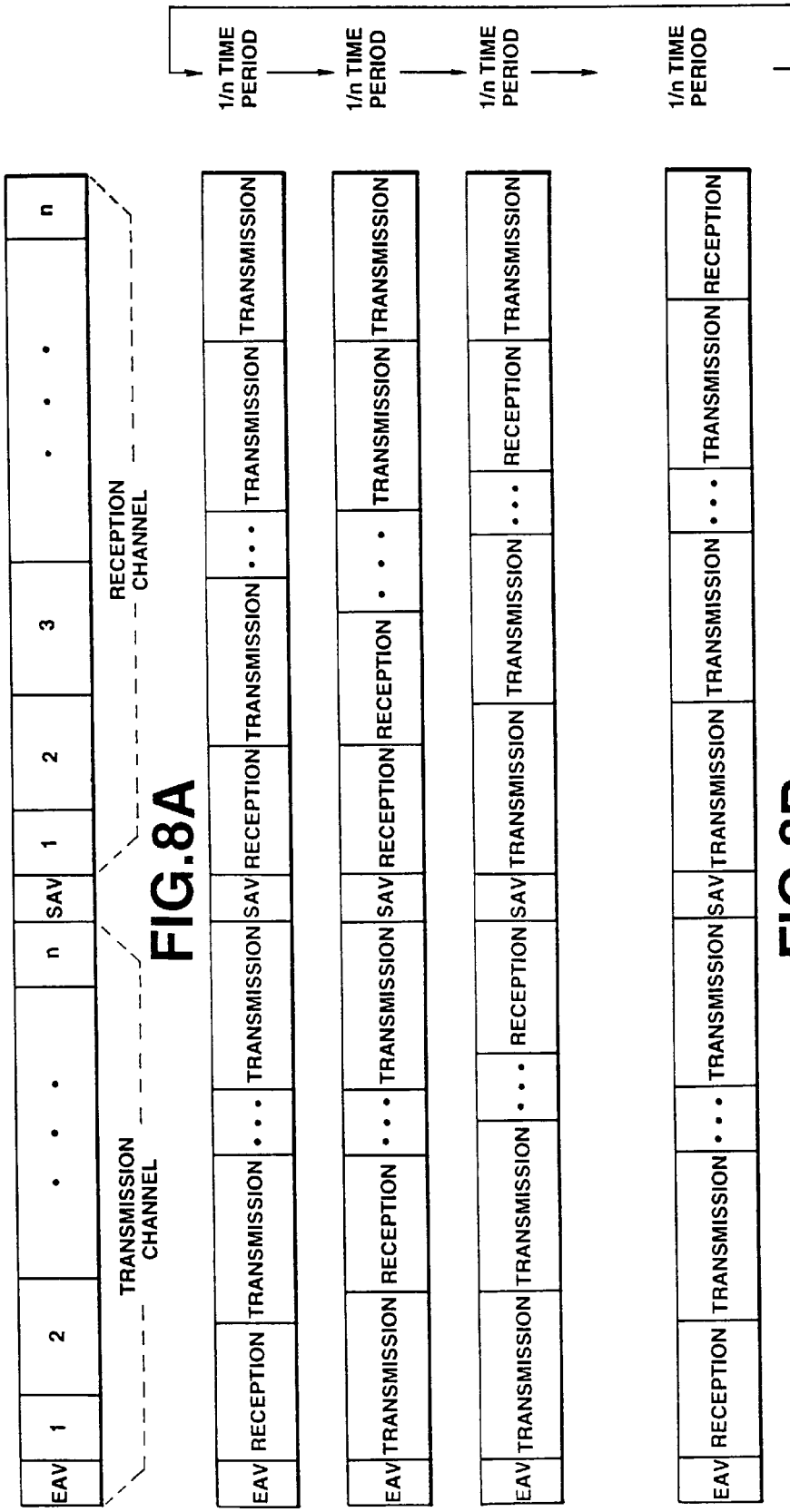
FIG. 8a illustrate a schematic arrangement of a line format of the second example of application of the SDDI format.
FIG. 8b illustrate a schematic arrangement of a line format of the second example of application of the SDDI format.

A second example of application of the method for digital signal transmission is shown in FIG. 8A and FIG. 8B.

Figure 9A:
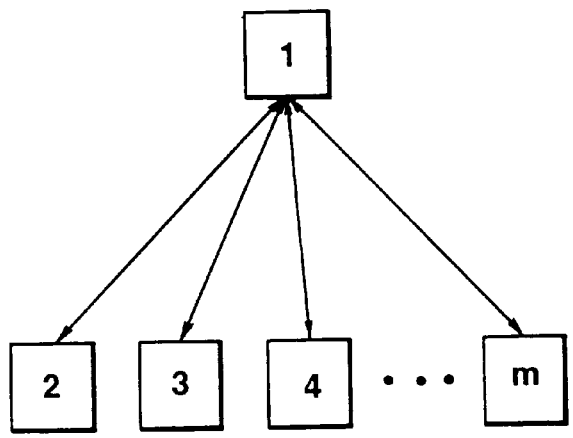
FIG. 9a illustrate a schematic arrangement of a bidirectional communication system by $\underline{m}$ transmission and reception equipment when employing the line format of the second example of application of FIG. 8.
Figure 9B:
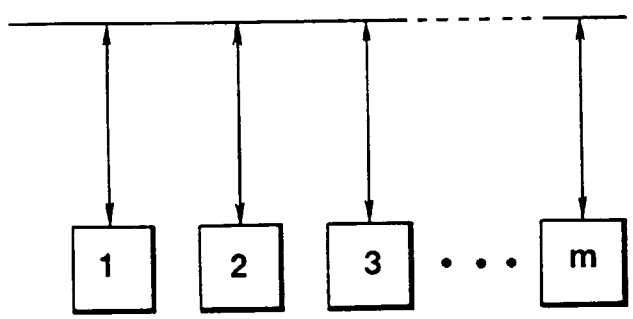
FIG. 9b illustrate a schematic arrangement of a bidirectional communication system by $\underline{m}$ transmission and reception equipment when employing the line format of the second example of application of FIG. 8.
Figure 9C:
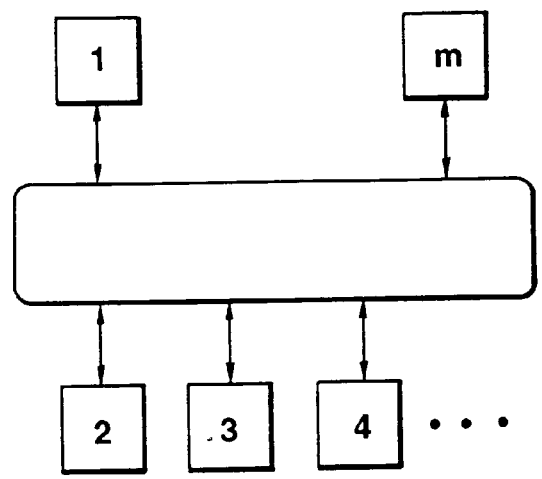
FIG. 9c illustrate a schematic arrangement of a bidirectional communication system by $\underline{m}$ transmission and reception equipment when employing the line format of the second example of application of FIG. 8.

With the present second example of application, each of the ancillary data section and the payload section in the SDDI format is divided into data having n̲ sub-areas, with the ancillary section being used as a channel for data transmission and the payload section being used as a channel for data reception, as shown in FIG. 8a. Alternatively, each area is time-multiplexed so as to be used for transmission and reception each by 1/n of the channel time, as shown in FIG. 8b. If the area in the SDDI format is divided into n̲ sub-areas dedicated to transmission and reception, it becomes possible to achieve bidirectional serial digital data communication between desired two of interconnected m̲ data transmission/reception equipment. The interconnection between the data transmission equipment T and the m̲ data reception equipment may be of a star shape as shown in FIG. 9a, a bus type as shown in FIG. 9b or of a ring type as shown in FIG. 9c.

If, with the above-described examples of application, an accessing method is taken into consideration, it becomes possible to carry out data communication equivalent to LAN which performs data transmission by exchange of packet data such as Ethernet or the token ring, or network data communication of the sub-area (band) appointment type network exchange system convenient for temporally continuous data communication such as picture or speech as employed in a usual telephone network. Also, it becomes possible to achieve a high-speed broad-range network.

Figure 10:
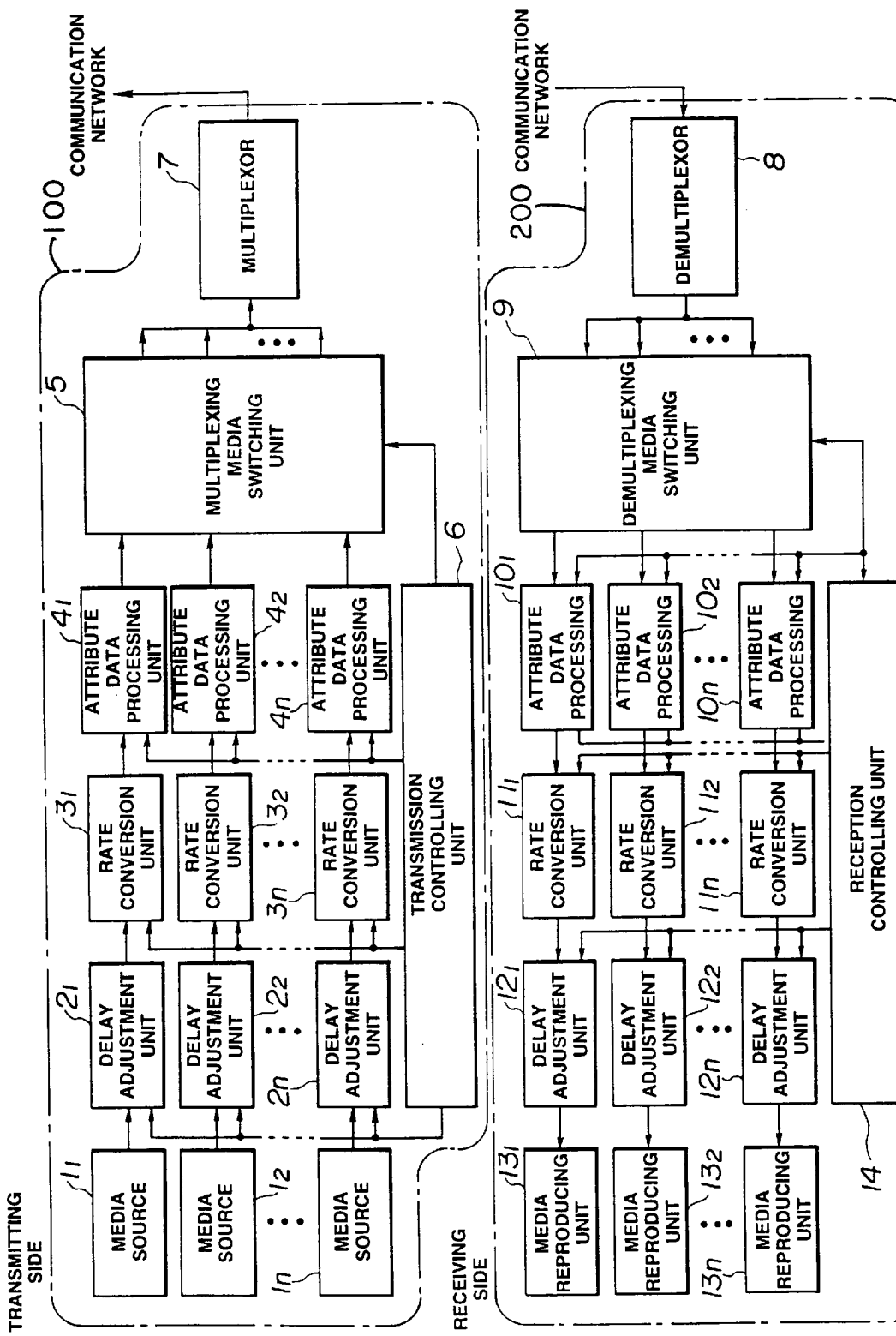
FIG. 10 illustrates a schematic arrangement of a digital signal transmission and reception apparatus according to the present invention.

A schematic arrangement of a digital signal transmission and reception apparatus, employing the above-described method for digital signal transmission, is shown in FIG. 10.

The basic data flow on the transmission side 100 of the digital signal transmission and reception device is symmetrical with respect to its reception side. That is, the transmission side 100 (transmitter) serially transmits signals multiplexed from data from a desired media source, while the reception side receives and reproduces the serially transmitted signals from the media source.

In one embodiment of the present invention, the transmission side 100, or encoder, incorporates a plurality of input channels for receiving and processing data from a pluraltiy of media sources (media source data) . The transmitting, or transmission, side 100 receives the media source data from media sources $1_1$ to $1_n$ and transmits it to delay adjustment units $2_1$ to $2_n$, respectively. The delay adjustment units $2_1$ to $2_n$ delay the output of the different media data by a predetermined amount as part of the process of getting all data to flow at a common data transmission rate. Output data of the delay adjustment units $2_1$ to $2_n$ are transmitted to rate conversion units (data transmission rate converters) respectively. The rate conversion units $3_1$ to $3_n$ convert the data transfer rates of the input data into the rate of transmission on the communication transmission channel (network). In other words, the data transmission rate is converted to a common data transmission rate. The media data, rate-converted by the rate conversion units $3_1$ to $3_n$, are subsequently transmitted to attribute information processing units (attribute data processors) $4_1$ to $4_n$, respectively. The attribute information processing units $4_1$ to $4_n$ append subsidiary data, or attribute data, to the respective media data. The appended attribute data may be the above-mentioned type area data or the byte count data in the SDDI format as previously explained. The data having the attribute data appended thereto in the attribute data processing units $4_1$ to $4_n$ are transmitted to a multi-media switching unit 5. The multi-media switching unit 5 optionally or alternately selects plural data from the media data output from the attribute processors and transmits the selected data to a multiplexing unit (multiplexor) 7.

A transmission control unit 6 transmits the control information to the delay adjustment units $2_1$ to $2_n$, rate conversion units $3_1$ to $3_n$, attribute information processing units $4_1$ to $4_n$ and to a multi-media switching unit 5, and causes processing to be performed in the delay adjustment units $2_1$ to $2_n$, rate conversion units $3_1$ to $3_n$, attribute information processing units $4_1$ to $4_n$ and in multi-media switching unit 5 based upon the control information. The multiplexing unit 7 multiplexes transmitted data from the attribute data processor into a serial signal which then is transmitted to a communication transmission channel, such as a communication network/LAN.

The receiving, or reception, side 200(receiver) receives the transmitted multiplexed data and transmits the received data to a separating unit (De-multiplexor) 8. The separating unit 8 demultiplexes the multiplexed serial data of plural media into the media data. The plural media-based data are transmitted to a demultiplexed media switching unit 9. The demultiplexed media switching unit 9 switches the transmitted media-based data to the appropriate media channel to transmit the data to attribute information processing unit (attribute data decoder) associated with the suitable media channels in attribute information processing units $10_1$ to $10_n$. Using the attribute information in the transmitted data, the attribute information processing units $10_1$ to $10_n$ carry out required processing and conversion and subsequently delete the attribute information from the data. Part of the attribute information is routed to a reception controlling unit 14 so as to be used for control in the reception controlling unit 14.

Output data of the attribute information processing units $10_1$ to $10_n$ are routed to rate conversion units (data transmission rate converters) $11_1$ to $11_n$. Since the data rate is the rate of transmission of the communication transmission channel, the rate conversion units $11_1$ to $11_n$ convert the data rate to a rate matched to data reproduction of the respective media data. The rate-converted data are routed to delay adjustment units $12_1$ to $12_n$. The delay adjustment units $12_1$ to $12_n$ perform delay processing most suited to the media on the transmitted data. These data are routed to and reproduced in the media reproducing units $13_1$ to $13_n$. The reception control unit 14 routes the control information to the demultiplexing media switching unit 9, attribute information processing units $10_1$ to $10_n$, rate conversion units $11_1$ to $11_n$ and to the delay adjustment units $12_1$ to $12_n$. Processing by the demultiplexing media switching unit 9, attribute information processing units $10_1$ to $10_n$, rate conversion units $11_1$ to $11_n$ and to the delay adjustment units $12_1$ to $12_n$ is carried out based upon the transmitted control information.

As an illustrative example of the above-described digital signal transmission and reception device, a digital signal transmission and reception device for transmitting the encoded digital video signals, digital audio signals and non-compacted digital audio data is hereinafter explained.

Figure 11:
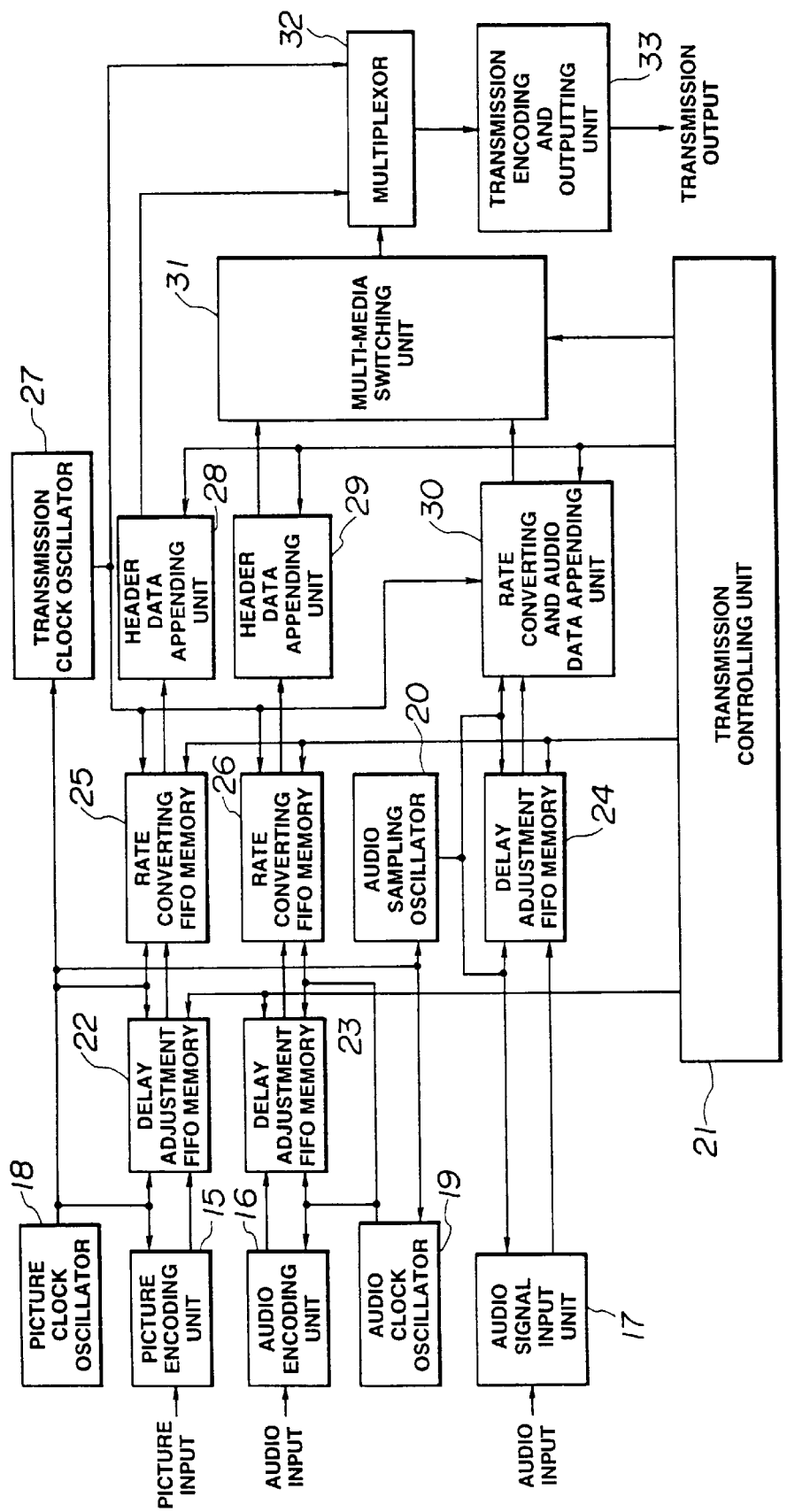
FIG. 11 illustrates an arrangement of a digital signal transmission apparatus according to the present invention.

An illustrative arrangement of a digital signal transmission device within the digital signal transmission and reception device is shown in FIG. 11.

From a picture encoding device 15, an audio encoding device 16 and an audio signal input unit 17 of FIG. 11, there are supplied encoded media source data such as video data, encoded audio data and non-compacted audio data, respectively, sampled by sampling clock signals from a picture clock generator 18 generating sampling clock signals for data of the respective media, an audio clock oscillator 19 and sampling clock signals from an audio sampling oscillator 20. The sampling clocks generated by the audio clock generator 19 and the audio sampling oscillator 20 are derived from the sampling clock signals of the video data generated by the picture clock generator 18. The audio sampling oscillator 20 generates sampling clock signals based upon clock signals from the audio clock generator 19.

The encoded video data, encoded audio data and non-compacted audio data from the respective media are fed to delay processing FIFO memories 22, 23 and 24 adapted for adjusting the media-based delay caused by processing, such as encoding. The delay processing FIFO memories 22 to 24 are fed with sampling clock signals from the picture clock oscillator 18, audio clock oscillator 19 and the audio sampling oscillator 20, respectively. Thus the encoded video data, encoded audio data and non-compacted audio data from the respective media are delayed to the extent required for the respective data, under control by a transmission control unit 21, so as to be written in the delay processing FIFO memories 22 to 24, based upon the input sampling clock signals, respectively. The respective media data are matched in time phase by the delay processing.

The encoded video data in the delay processing FIFO memory 22 and the encoded audio data in the delay processing FIFO memory 23 are subsequently read out based upon the sampling clock signals from the picture clock oscillator 18 and the audio clock generator 19 so as to be written in rate conversion FIFO memories 25 and 26, respectively. The data written in the rate conversion FIFO memories 25 and 26 are read out based upon transmission clock signals, that is clock signals generated by a transmission clock generator 27, so as to be sampled at the transmission rate and processed with rate conversion. The rate-converted data from the rate converting FIFO memories 25 and 26 are routed to header data appending units 28 and 29, respectively. The header data appending units 28 and 29 append header data required for the respective data.

The non-compacted audio data in the delay processing FIFO memory 24 are routed to a rate converting and audio data flag appending unit 30 which is also fed with clock signals from the transmission clock generator 27. The data rate conversion and data appendage such as appendage of audio data flags, are collectively carried out at the rate converting and audio data flag appending unit 30.

A multi-media switching unit 31 selects one of the output encoded audio data from the header data appending unit 29 and the non-compacted audio data outputted from the rate converting and audio data flag appending unit 30. The audio data as selected by the multi-media switching unit 31 and the output encoded video data from the header data appending unit 28 are multiplexed in a multiplexing unit 32, using clock signals from the transmission clock generator 27. The resulting multiplexed serial signals are transmitted to a transmission encoding and outputting unit 33. The transmission encoding and outputting unit 33 performs appropriate transmission channel encoding on the transmitted multiplexed data and outputs the processed data to a communication network.

Figure 12:
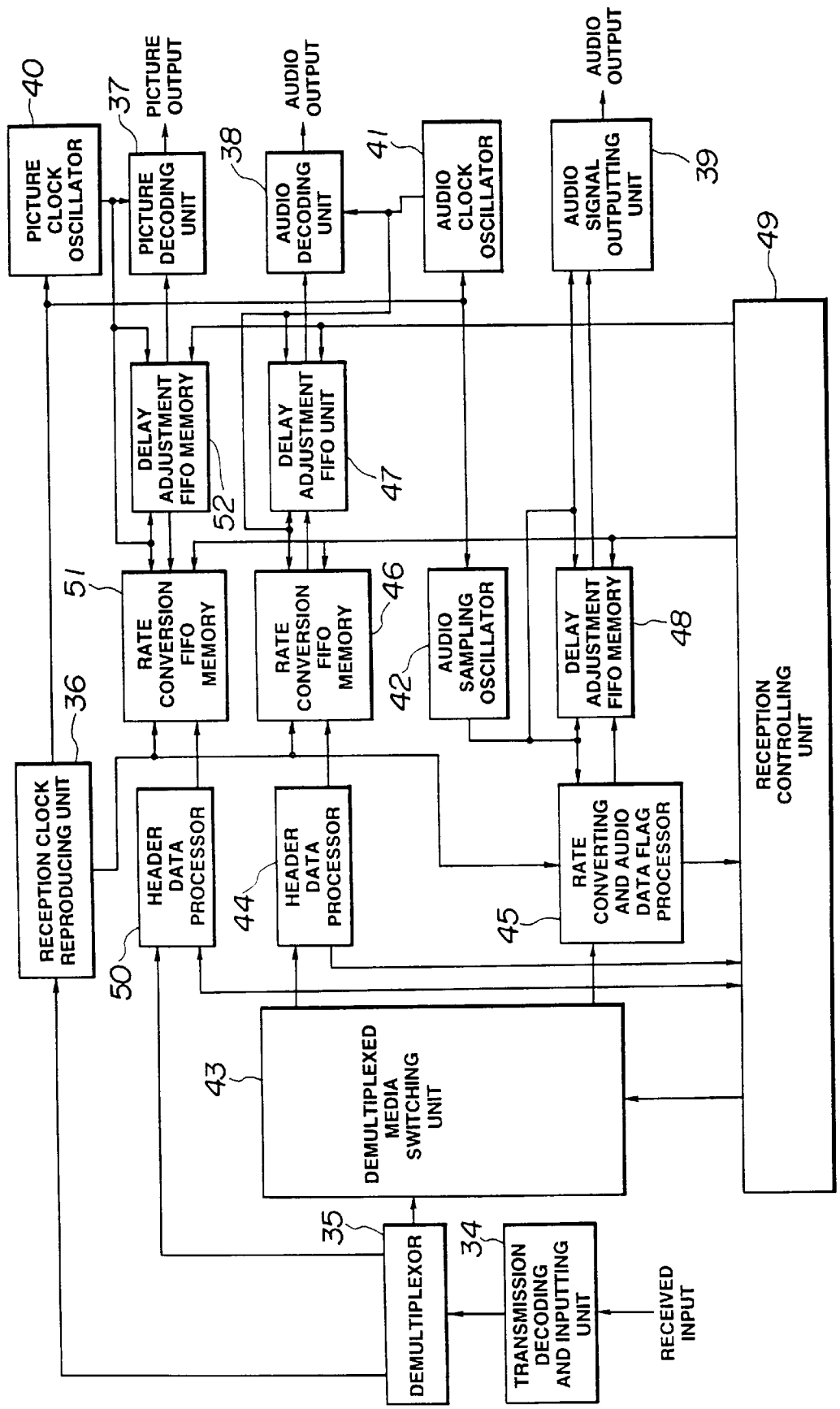
FIG. 12 illustrates an arrangement of a digital signal transmission and reception apparatus according to the present invention.

The transmitted data is received and reproduced by a digital signal reception device shown in FIG. 12.

The transmitted data is first received by a transmission decoding and reception unit 34 of FIG. 12 and transmission channel decoded so as to be then supplied to a demultiplexing unit 35. The demultiplexing unit 35 demultiplexes the transmitted data to respective media-based data. Simultaneously, the transmission clock signal data are routed to a reception clock reproducing unit 36 where transmission clock signals are reproduced. From the reproduced transmission clock signals are derived the above-mentioned reproducing clock signals generated by a picture clock generator 40, a sound clock oscillator 41 and a sound sampling oscillator 42 inputting the reproducing clock signals to a picture decoding device 37, an audio decoding device 38, an audio decoding device 38 and an acoustic signal outputting unit 39.

Of the media-based audio data, demultiplexed by the demultiplexing unit 35, the audio data is transmitted to a demultiplexed media switching unit 43. The demultiplexed media switching unit 43 changes over the transmitted audio data by the encoded audio data or the non-compacted audio data so that the encoded audio data and the non-compacted audio data are transmitted to a header data processing unit 44 and to a rate converting and audio data flag processing unit 45, respectively.

The header data processing unit 44 performs data processing using header data of the transmitted encoded audio data. The header data is simultaneously transmitted to a reception control unit 49. The processed data is written in a rate converting FIFO memory 46, based on the transmission clock signals from the reception clock reproducing unit 36, and is subsequently read out based upon the reproducing clock signals from the audio clock oscillator 41, under control by the reception controlling unit 49, in order to perform rate conversion on the sampling clock signals of the encoded audio data. The rate converting and audio data flag processing unit 45 collectively processes the transmitted non-compacted audio data with data rate conversion based upon the reproducing clock signals from the sound sampling oscillator 42 and with data processing employing the audio data flag.

The rate-converted data from the rate converting FIFO memory 46 and the processed data from rate converting and audio data flag processing unit 45 are written in delay adjustment FIFO memories 47 and 48, based upon the reproducing clock signals from the audio clock oscillator 41. The delay adjustment FIFO memories 47 and 48 are controlled by the reception controlling unit 49 for delay adjustment among the respective media taking into account the delay caused in the respective media due to decoding. Thus the data adjusted for delay is read out from the delay adjustment FIFO memories 47 and 48 based upon the reproducing clock signals from the sound clock oscillator 41 so as to be transmitted to the audio decoding device 38 and the audio signal outputting unit 39.

The transmitted encoded audio data is decoded by the audio decoding device 38 to reproduce digital audio data. Digital audio data is also outputted from the audio signal output 39.

The video data demultiplexed by the demultiplexing unit 35 is transmitted to a header data processing unit 50. The header data processing unit 50 performs data processing using header data of the transmitted encoded video data. The header data information is also supplied to the reception controlling unit 49. The processed data is written in a rate converting FIFO memory 51, based upon transmission clock signals from the reception clock reproducing unit 36, and is subsequently read out based upon the reproducing clock signals from the picture clock oscillator 40 under control by the reception controlling unit 49, for rate converting the sampling clock signals of the encoded video data. The rate converted data from the rate converting FIFO memory 51 is written in a delay adjustment FIFO memory 52 based on the playback clock signals from the picture clock oscillator 40. The delay adjustment FIFO memory 52 is controlled by the reception controller 49 as to delay adjustment among the respective media taking into account the delay introduced by e.g., decoding for the respective media. Thus the delay-adjusted data is read from the delay adjustment FIFO memory 52, based upon the reproducing clock signals from the picture clock oscillator 40, so as to be supplied to the picture decoding device 37. The picture decoding device 37 decodes the transmitted encoded video data for reproducing digital video data.

Figure 13:
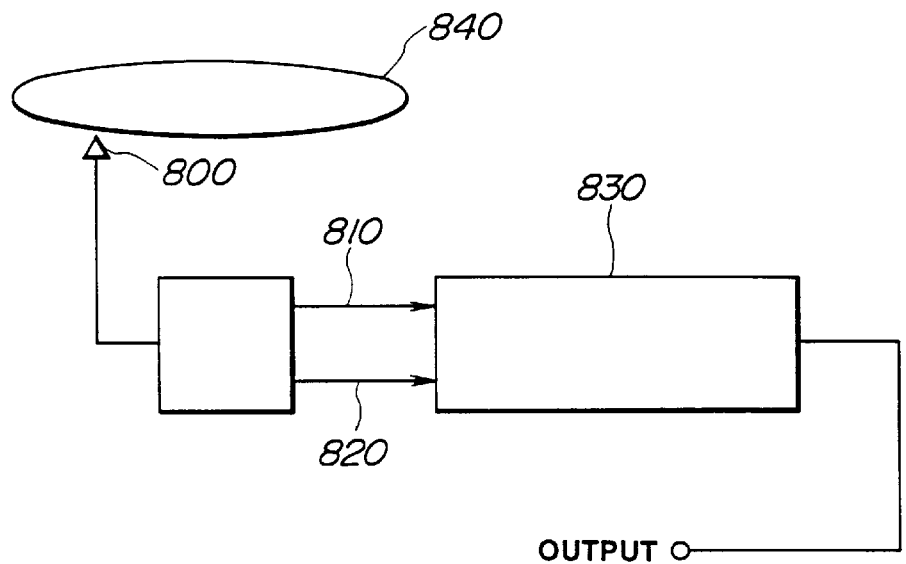
FIG. 13 illustrates an embodiment of the present invention.

Another embodiment of the present invention is shown in FIG. 13. This embodiment incorporates a sensor 800 for reading data, such as video data 810, audio data 820, graphic data or text data, from an optical disc recording medium 840 such as, for example, a digital video disc, compact disc, mini disc or the like. A transmitter 830, such as that described in FIG. 10, is included to accomodate each type of data read from the optical disc, and to process the data read from the optical disc to append header or attribute data and to convert the data transmission rate of each type of input data to a common data transmission rate. One example of this embodiment includes a video camera or imager and recorder device for recording video or audio data onto the optical recording medium.

Figure 14:
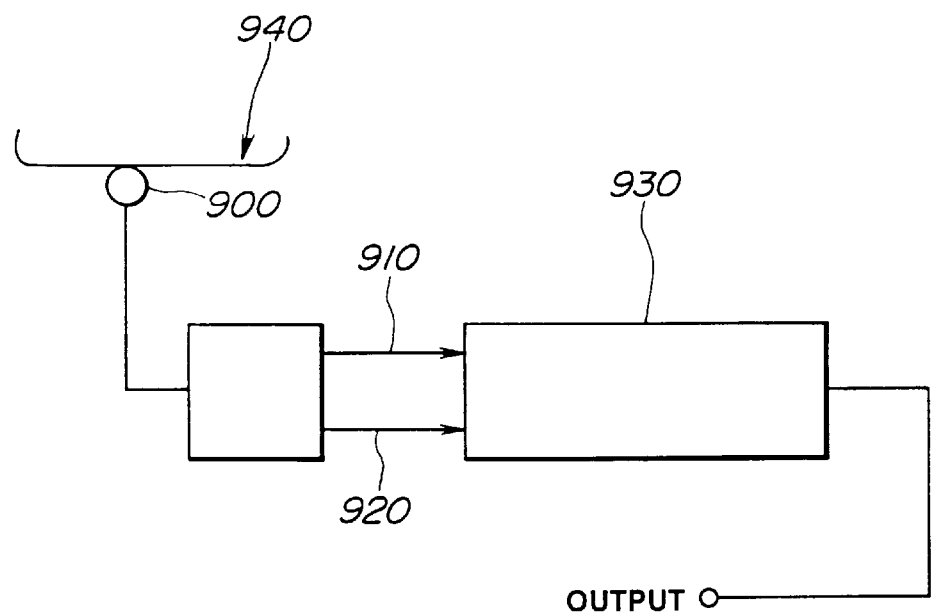
FIG. 14 illustrates an embodiment of the present invention.

Another embodiment is shown in FIG. 14 and includes a magnetic reproducing head 900 for reading data recorded on a magnetic recording medium 940 such as, for example, a magnetic tape or disc. The signal read from the magnetic recording medium (video data signal 910 and audio data signal 920) is then passed to a transmitter 930 such as that described in FIG. 10, where it is then processed to add header or attribute data and to convert the data tranmission rate to a common, predetermined data transmission rate. One example of this embodiment includes a video camera or imager and recorder device for recording video or audio data onto the magnetic recording medium.

Figure 15:
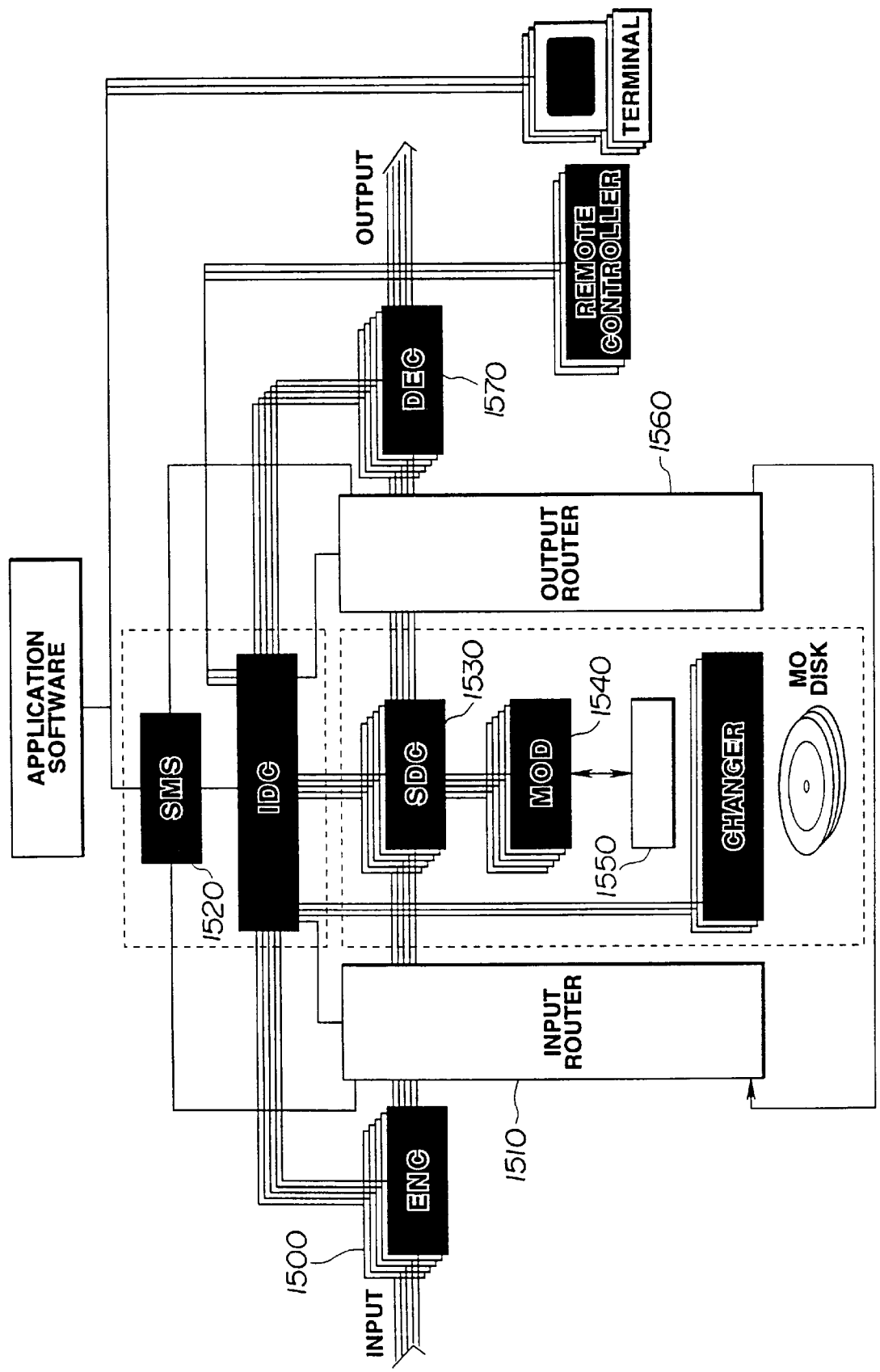
FIG. 15 illustrates an embodiment of the present invention.

A further embodiment of the present invention is shown in FIG. 15. Data, such as video, audio or text data, from a plurality of various sources are input and received by the encoder (ENC) 1500, which transforms input data from one predetermined format into an output signal of another predetermined format at predetermined data transmission rate. Encoder 1500, performs the function of the transmission side 100 previously described herein. The output of Encoder 1500 is then provided to an input router 1510 which is controlled by Server Management System controller(SMS) 1520. The output from input router 1510 is directed to Server Data Controller (SDC) 1530 which directs the input data from Input router 1510 to a recorder/player MOD 1540 for selectively recording the input data onto a recording medium 1550, such as an Magneto Optical disk. Recorder/Player 1540 also performs the function of reading data recorded on a recording medium 1550 and outputting same to an output router 1560. Output router 1560 then outputs the data read from recording medium 1550 to a decoder section (DEC) 1570 which performs the functions of the receiving side 200 previously described herein. Output data from decoder 1570 can then be routed to any number of devices, including reproduction devices for the various data formats, or editing equipment for selectively compiling data into a desired sequence or form.

In view of the above description of the present invention, it will be appreciated by those skilled in the art that many variations modifications and changes can be made to the present invention without departing from the spirit or scope of the present invention as defined by the appended claims hereto. All such variations, modifications or changes are fully contemplated by the present invention.

What is claimed is:

1. An apparatus for transmitting a digital signal comprising:

a plurality of data outputting media sources;

a plurality of delay adjustment units for respectively adjusting the delay of the data from said media sources;

a plurality of rate converting units for converting the data transmission rate of the respective data from the delay adjustment units into a transmission rate of a transmission channel;

a plurality of attribute information processing units for appending the attribute information, including at least byte count data indicative of a quantity of data included in a data portion of said respective data, including at least said delay, to the respective data from said rate converting units;

multi-media switching unit for selecting data of one of the respective media sources from the attribute information processing units;

transmission controlling unit for controlling said delay adjustment units, rate converting units, attribute information processing units and said multi-media switching unit; and multiplexing unit for multiplexing plural data from said multi-media switching unit.

2. A device for receiving a digital signal comprising:

demultiplexing unit for demultiplexing plural multiplexed data into media source based data;

a demultiplexed media switching unit for switching plural data from the demultiplexing unit into respective suitable media channels;

a plurality of attribute information processing unit for processing the plural data switched by said demultiplexed media switching unit based upon the attribute information, including at least byte count data indicative of a quantity of data included in a data portion of said respective data, including at least a delay, for these data;

a plurality of rate converting units for converting the transmission rate of the respective data from the attribute information processing units into the playback rate for data reproduction;

a plurality of delay adjustment units for adjusting the respective data from the plural rate conversion units by an appropriate amount to generate optimum delay amounts; and a plurality of media reproducing units for respectively reproducing the data from the delay adjustment units.

3. A digital signal transmitting and receiving system comprising:

a transmitting side;

a receiving side;

said transmitting side comprises a plurality of data outputting media sources, a plurality of delay adjustment units for respectively adjusting a delay of the transmission of data from said media sources, a plurality of rate converting units for converting the data transmission rate of the respective data output from said rate converting units into a transmission rate of a transmission channel, a plurality of attribute information processing units for appending the attribute information, including at least byte count data indicative of a quantity of data included in a data portion of said respective data, including at least said delay, to the respective data from said rate converting units, a multi-media switching unit for selecting data of one of the respective media sources from the attribute information processing units, a transmission controlling unit for controlling said delay adjustment units, rate converting units, attribute information processing units and the multi-media switching unit, and a multiplexing unit for multiplexing plural data from said multi-media switching unit; and said receiving side comprises demultiplexing unit for demultiplexing plural multiplexed data to produce media source based data, demultiplexing media switching unit for switching plural data from said demultiplexing unit into respective suitable media channels, a plurality of attribute information processing unit for processing the plural data switched by said demultiplexed media switching unit based upon the attribute information, including at least byte count data indicative of a quantity of data included in a data portion of said respective data, including at least said delay, for these data, a plurality of rate converting units for converting the transmission rate of the respective data from the attribute information processing units into the playback rate for data reproduction, a plurality of delay adjustment units for adjusting the respective data from said rate conversion units into optimum delay duration, a plurality of media reproducing units for respectively reproducing data from said delay adjustment units.

4. A digital signal transmission system comprising:

a transmitter for transmitting digital signals;

a receiver for receiving digital signals transmitted from said transmitter;

said transmitter comprises:

a plurality of input channels for receiving data from any one of a plurality of predetermined media sources;

each of said plurality of input channels comprise:
an input for receiving media source data from a predetermined media source at a predetermined data transmission rate;
first delay for delaying said media source data by a predetermined duration before outputting same to a first data transmission rate converter;
said first data transmission rate converter converts the transmission rate of said media source data from said predetermined data transmission rate to a common data transmission rate and outputs same to a first attribute data processor;
said first attribute data processor appends predetermined attribute data, including at least byte count data indicative of a quantity of data included in a data portion of said respective data, including at least said first delay, to said media source data and outputs same;
multiplexor for multiplexing the output from said plurality of input channels-and outputting a multiplexed signal at a common data transmission rate to a communication network;
switcher for selectively routing said output from said attribute data processors of each of said plurality of input channels to said multiplexor;
said receiver comprises:
demultiplexor for receiving a multiplexed data signal at a common data transfer rate from said communication network and demultiplexing said multiplexed signal to produce a plurality of data signals and output same to a plurality of output channels;
each of said output channels comprise:
first attribute data decoder for decoding attribute data, including at least byte count data indicative of a quantity of data included in a data portion of said respective data, including at least said first delay, appended to said data signal;
second data transmission rate convertor for converting the data transmission rate of a said data signal from said common data transmission rate to a predetermined data transmission rate and outputting same to a second delay; and
said second delay provides a predetermined delay to said data signal before outputting same to a predetermined media reproduction device.

5. A digital signal transmitting device according to claim 4 wherein said media sources comprise video data sources.

6. A digital signal transmitting device according to claim 4 wherein said media sources comprise audio data sources.

7. A digital signal transmitting device comprising:
a first and second input channel for receiving data from a first and a second predetermined media source and forwarding said data to first and second input processing portions, respectively;
each of said first and second input processing portions comprise:
an input for receiving media source data from a predetermined media source at a predetermined data transmission rate; delay for delaying said media source data by a predetermined duration before outputting same to a data transmission rate converter; said data transmission rate converter converts the transmission rate of said media source data from said predetermined data transmission rate to a common data transmission rate and outputs same to an attribute data processor; said attribute data processor appends predetermined attribute data, including at least byte count data indicative of a quantity of data included in a data portion of said respective data, including at least said delay, to said media source data and outputs same;
multiplexor for multiplexing the respective outputs from said first and second input channels and outputting a multiplexed signal at a common data transmission rate to a communication network;
switcher for alternately routing said outputs from said attribute data processors of said first and second input channels to said multiplexor;
said first predetermined media source comprises a video data source; and
said second predetermined media source comprises an audio data source.

8. A digital data signal receiver comprising:
demultiplexor for receiving a multiplexed data signal at a common data transfer rate from a communication network, and demultiplexing said multiplexed signal to produce a plurality of data signals and output same to a plurality of output channels;
each of said output channels comprise attribute data decoder for decoding attribute data, including at least byte count data indicative of a quantity of data included in a data portion of said respective data, including at least a delay, appended to each of said data signals; data transmission rate convertor for converting the data transmission rate of a said data signal from said common data transmission rate to a predetermined data transmission rate and outputting same to a delay; and
said delay provides a predetermined delay to said data signal before outputting same to a predetermined media reproduction device.

9. A digital signal transmission device comprising:
sensor for reading data recorded on an optical disc media to produce an audio media source data signal and a video media source data signal;
transmitter comprising a first and a second input channel for receiving said audio signal and said video signal from said sensor and forwarding said data to first and second input processing portions, respectively;
said first and second input processing portions each comprise an input for receiving an input signal at a predetermined data transmission rate; delay for delaying said input signal by a predetermined duration before outputting same to a data transmission rate converter; said data transmission rate converter converts the transmission rate of said input signal from said predetermined data transmission rate to a common data transmission rate and outputs same to an attribute data processor; said attribute data processor appends predetermined attribute data, including at least byte count data indicative of a quantity of data included in a data portion of said respective data, including at least said delay, to said input signal and outputs same;
multiplexor for multiplexing the respective outputs from said first and second input channels and outputting a multiplexed signal at a common data transmission rate to a communication network; and
switcher for alternately routing said outputs from said attribute data processors of said first and second input channels to said multiplexor.

10. A digital signal transmission device comprising:
reproducing head for reading data recorded on a magnetic recording medium to produce an audio media source data signal and a video media source data signal;

transmitter comprising a first and a second input channel for receiving said audio signal and said video signal from said sensor and forwarding said data to first and second input processing portions, respectively;

said first and second processing portions each comprise:
an input for receiving an input signal at a predetermined data transmission rate; delay for delaying said input signal by a predetermined duration before outputting same to a data transmission rate converter; said data transmission rate converter converts the transmission rate of said input signal from said predetermined data transmission rate to a common data transmission rate and outputs same to an attribute data processor; said attribute data processor appends predetermined attribute data, including at least byte count data indicative of a quantity of data included in a data portion of said respective data, including at least said delay, to said input signal and outputs same;

multiplexor for multiplexing the respective outputs from said first and second input channels and outputting a multiplexed signal at a common data transmission rate to a communication network; and switcher for alternately routing said outputs from said attribute data processors of said first and second input channels to said multiplexor.

11. A data transmission device according to claim 10, wherein said magnetic recording medium comprises a magnetic disc medium.

12. A data transmission device according to claim 10, wherein said magnetic recording medium comprises a magnetic tape medium.

* * * * *